(12) United States Patent
Day

(10) Patent No.: US 8,327,166 B2
(45) Date of Patent: Dec. 4, 2012

(54) POWER MANAGMENT FOR STORAGE DEVICES

(75) Inventor: Brian A. Day, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 382 days.

(21) Appl. No.: 12/766,032

(22) Filed: Apr. 23, 2010

(65) Prior Publication Data

US 2010/0299549 A1  Nov. 25, 2010

Related U.S. Application Data

(60) Provisional application No. 61/216,732, filed on May 21, 2009.

(51) Int. Cl.
*G06F 1/18* (2006.01)
*G06F 1/26* (2006.01)

(52) U.S. Cl. ........ 713/300; 713/310; 713/320; 713/330; 713/340

(58) Field of Classification Search .................. 713/300, 713/320, 340, 310, 330
See application file for complete search history.

(56) References Cited

U.S. PATENT DOCUMENTS

| 7,474,926 | B1 | 1/2009 | Carr et al. | |
| 7,996,690 | B2* | 8/2011 | Shetty et al. | 713/300 |
| 2003/0005339 | A1* | 1/2003 | Cohen et al. | 713/300 |
| 2003/0037269 | A1* | 2/2003 | Baker et al. | 713/320 |
| 2003/0065958 | A1* | 4/2003 | Hansen et al. | 713/300 |
| 2004/0201931 | A1* | 10/2004 | Korcharz et al. | 361/18 |
| 2004/0215779 | A1 | 10/2004 | Weber | |
| 2007/0110360 | A1* | 5/2007 | Stanford | 385/14 |
| 2008/0077817 | A1* | 3/2008 | Brundridge et al. | 713/340 |
| 2008/0162773 | A1 | 7/2008 | Clegg et al. | |
| 2011/0029787 | A1* | 2/2011 | Day et al. | 713/300 |

FOREIGN PATENT DOCUMENTS

EP  1895396  3/2008

* cited by examiner

*Primary Examiner* — Vincent Tran
(74) *Attorney, Agent, or Firm* — Duft Bornsen & Fishman LLP

(57) ABSTRACT

Methods and systems are provided for managing power allocation to a SAS target coupled with a SAS initiator through a SAS expander. The expander exchanges messages with the target to manage the power allocation to the target. The target transmits a power request message through the expander to the initiator. In some embodiments, the initiator transmits a power request received message to the expander. The expander may then transmit a power grant message to the target in response to receiving the power request received message. In other embodiments, the expander monitors the messages transmitted from the target to the initiator. The expander may then transmit a power grant message to the target in response to the expander monitoring the power request message.

17 Claims, 7 Drawing Sheets

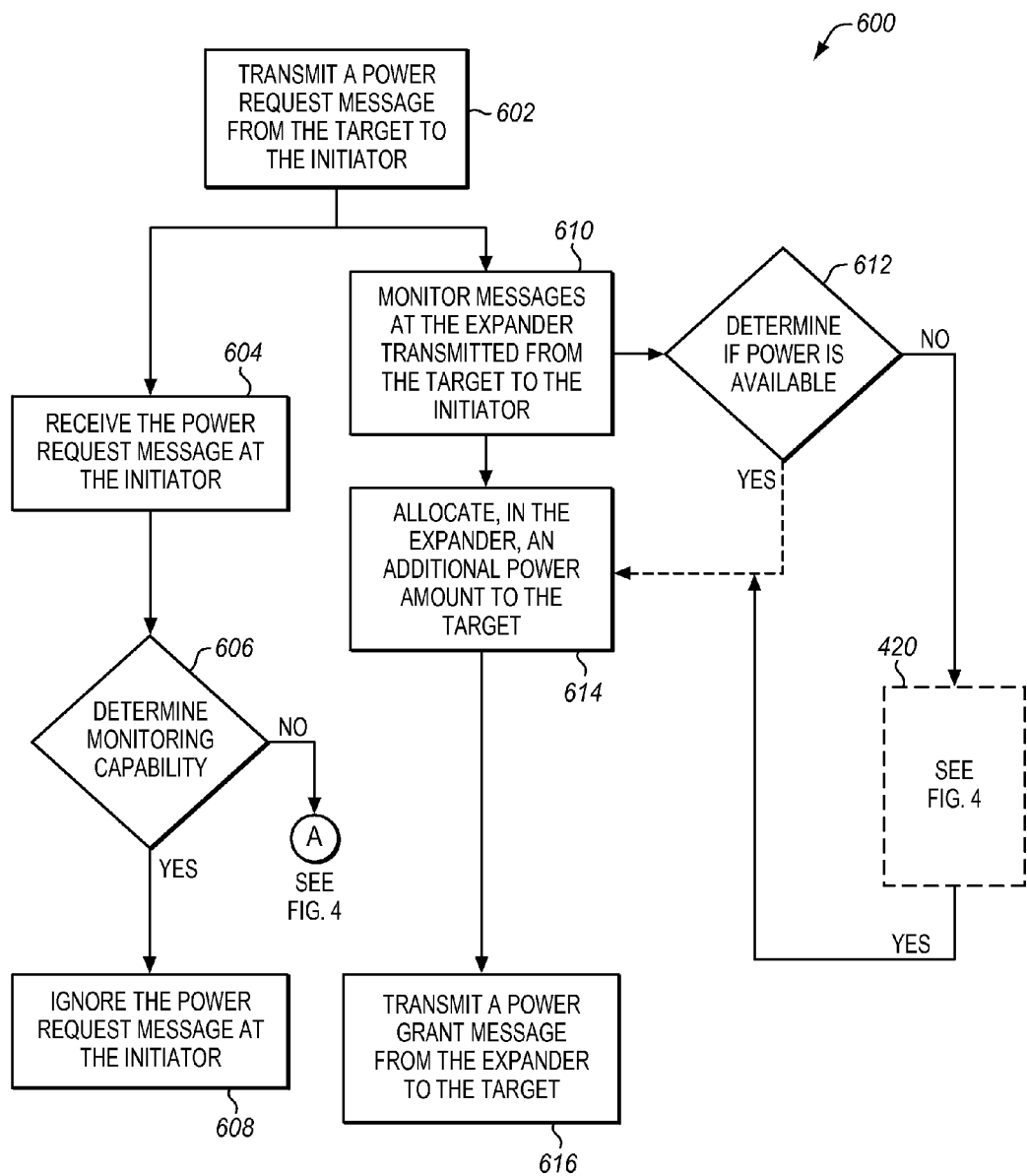

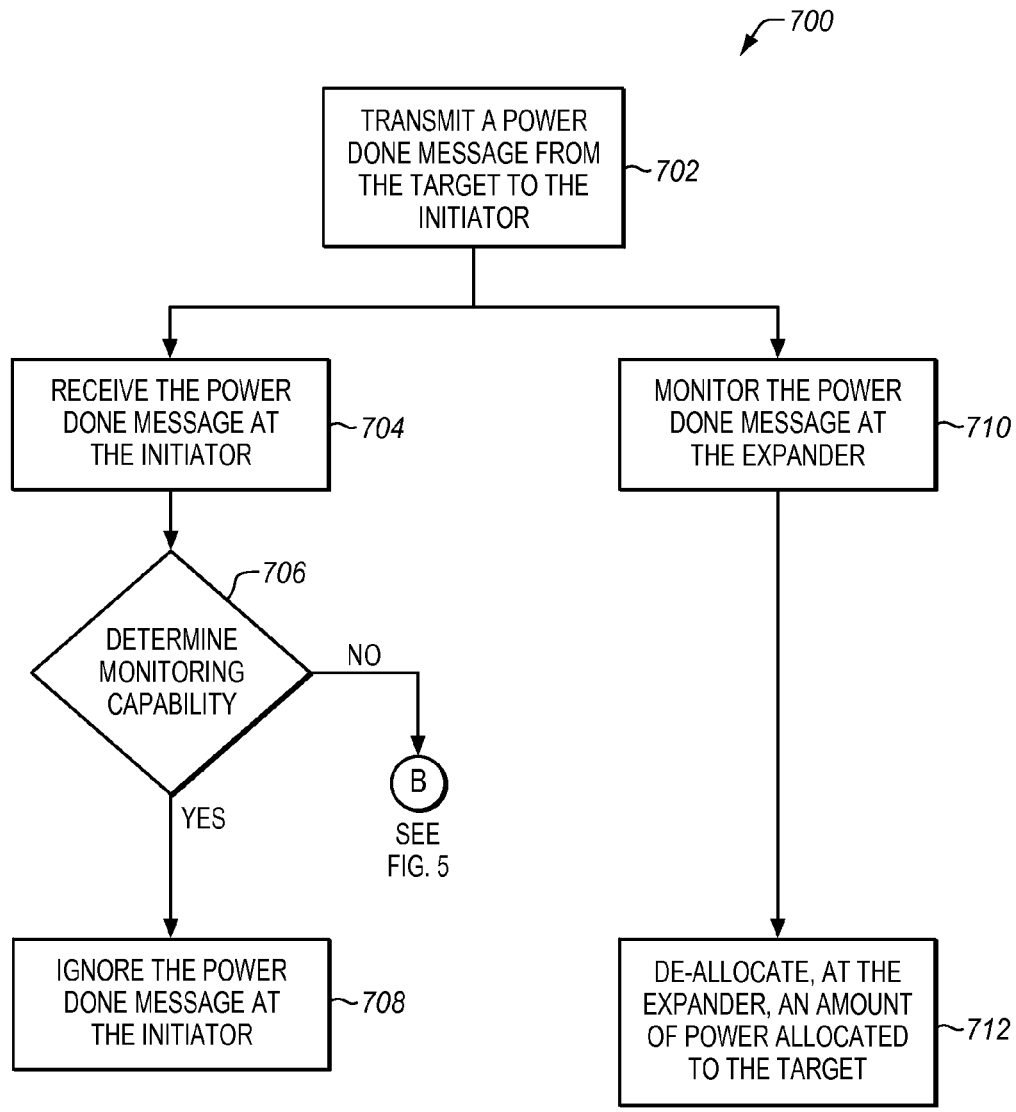

POWER MANAGMENT FOR STORAGE DEVICES

This patent claims priority from a U.S. provisional patent application No. 61/216,732 filed on May 21, 2009, which is hereby incorporated by reference.

BACKGROUND

1. Field of the Invention

The invention relates generally to management of power allocation to storage devices, and more particularly, to management of power allocation to storage devices coupled with a controller through an expander.

2. Related Patents

This patent is related to commonly owned U.S. patent Ser. No. 12/510,699 entitled METHODS AND APPARATUS FOR POWER ALLOCATION IN A STORAGE SYSTEM, which is hereby incorporated by reference.

3. Discussion of Related Art

In a variety of electronic systems, a shared power source is used to power a number of devices of the system under control of a common control unit. For example, a storage system may coordinate the application of power from a power supply to each of a plurality of storage devices. In particular, each of the storage devices may be, for example, a rotating disk drive. Such devices may utilize minimal power when initially applied but may then consume substantially more power as the disk drive's motor starts to spin the rotating storage media within the disk drive. Although the disk drive may consume less power once the motor has reached the desired rotational speed (i.e., in steady state operation), initially the disk drive may require substantially more power to commence rotation and complete its initialization.

In many present-day storage systems including, for example, a Serial Attached SCSI (SAS) system, a controlling device (e.g., SAS initiator) coupled with the storage devices (e.g., SAS targets) may utilize command structures and protocol primitives/sequences to control and sequence the "spin-up" of each storage device under its control. The controlling device may limit the number of disk drives enabled to spin-up at any given point in time until eventually all disk drives are started and spinning. Thus, a controlling device may limit the spin-up power requirements for the disk drives under its control. However, the controlling device may not have knowledge of how long the disk drives may require the additional power to complete initialization. Thus, present controlling devices presume a worst-case scenario allowing a maximum possible time duration for the initialization of each disk drive coupled thereto. This solution may cause a significant, unnecessary delay in the initialization of the storage system and hence delays in access to the storage system by attached host systems.

In some storage system environments, the storage devices may be coupled to multiple controlling devices or may autonomously change their power consumptions status. Further, the controlling device may not even be coupled in the same power domain to allow it to have knowledge of the available power status of the storage devices.

Thus, it is an ongoing challenge to manage the power allocation for storage devices when the storage devices require additional power during initialization.

SUMMARY

The present invention solves the above and other problems, thereby advancing the state of the useful arts, by providing methods and systems for managing power allocation to a SAS target coupled with a SAS initiator through a SAS expander. The expander exchanges messages with the target to manage the power allocation to the target. The target transmits a power request message through the expander to the initiator. In some embodiments, the initiator transmits a power request received message to the expander. The expander may then transmit a power grant message to the target in response to receiving the power request received message. In other embodiments, the expander monitors the messages transmitted from the target to the initiator. The expander may then transmit a power grant message to the target in response to the expander monitoring the power request message.

In one aspect hereof, a method operable in a system comprising a SAS target, a SAS expander communicatively coupled with the target, and a SAS initiator communicatively coupled with the expander is provided. According to the method, a power request message is transmitted from the target through the expander to the initiator. The power request message is received at the initiator. A power request received message is transmitted from the initiator to the expander in response to receiving the power request message. An additional power amount to the target is allocated within the expander in response to receiving the power request message. Further according to the method, a power grant message is transmitted from the expander to the target in response to receiving the power request message.

In another aspect hereof, a method operable in a system comprising a SAS target, a SAS expander communicatively coupled with the target, and a SAS initiator communicatively coupled with the expander is provided. According to the method, a power request message is transmitted from the target through the expander to the initiator. Messages transmitted between the target and the initiator are monitored at the expander. An additional power amount to the target is allocated within the expander in response to the expander monitoring the power request message. Further according to the method, a power grant message is transmitted from the expander to the target in response to monitoring the power request message.

Another aspect hereof provides a system comprising a SAS expander, a SAS initiator, and a SAS target. The expander includes a power management module and an internal initiator module. The initiator is communicatively coupled with the expander. The target is communicatively coupled with the expander and is operable to transmit a power request message through the expander to the initiator. The power management module of the expander is operable to allocate an additional power amount to the target, and the internal initiator module of the expander is operable to transmit a power grant message to the target. In some embodiments, the expander further includes an internal target module. In these embodiments, the initiator is further operable to transmit a power request received message to the internal target module of the expander in response to the reception of the power request message. The expander may then allocate the additional power amount and transmit the power grant message in response to receiving the power request received message. In other embodiments, the expander further includes a monitoring module operable to detect messages transmitted from the target to the initiator. In these embodiments, the expander may then allocate the additional power amount and transmit the power grant message in response to monitoring the power request message.

BRIEF DESCRIPTION OF THE DRAWINGS

FIGS. 4-7 are flowcharts of exemplary methods in accordance with features and aspects hereof for managing the power allocation for a SAS target.

DETAILED DESCRIPTION OF THE DRAWINGS

Figure 1:
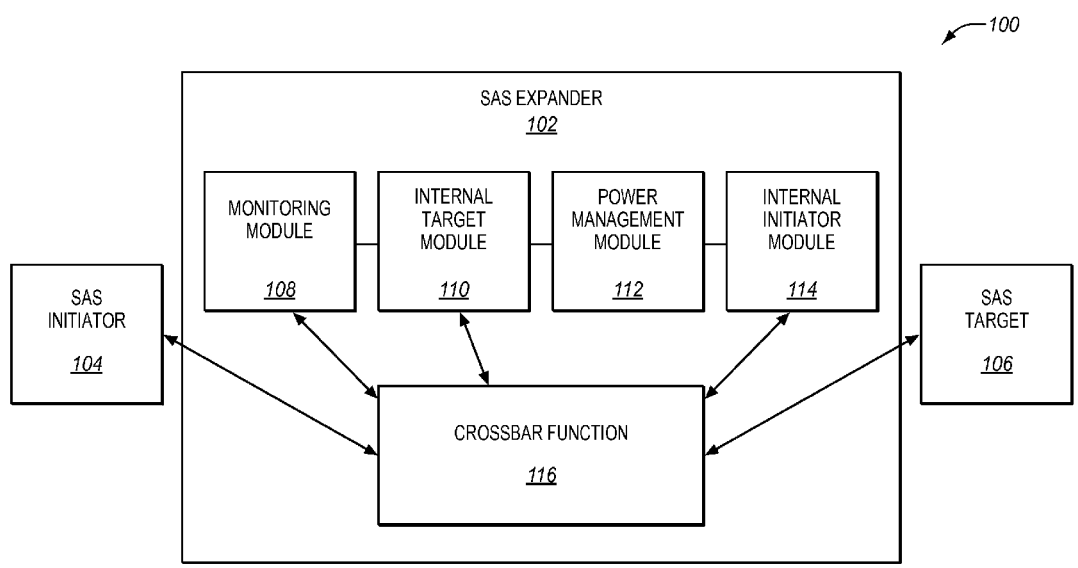
FIG. 1 is a block diagram of an exemplary system adapted in accordance with features and aspects hereof to manage the power allocation for a SAS target.

FIG. 1 is a block diagram of an exemplary system 100 adapted in accordance with features and aspects hereof to manage the power allocation for a SAS target. System 100 includes a SAS expander 102 coupled with a SAS initiator 104 and a SAS target 106. Target 106 may include any storage device operable to store data, such as a disk drive. In addition, initiator 104 may include any device for initiating SAS communication with target 106, including a host system, a host bus adapter in a host system, and a storage controller, etc. Expander 102 may be any suitable computing device acting in the role of a SAS expander. In system 100, a crossbar function 116 within expander 102 couples target 106 with initiator 104 using internal signal and routing logic (not shown) to pass signals between target 106 and initiator 104. Crossbar functions/switches are common in SAS expander designs and therefore are well known to one skilled in the art. Although only one target 106 and one initiator 104 is shown in system 100, one skilled in the art will recognize that multiple targets and initiators may be included in system 100, which may be communicatively coupled in a variety of topologies. In system 100, expander 102 is operable to manage the power allocation for target 106 either alone or in combination with initiator 104. Additional details regarding the operation of system 100 will be discussed with reference to FIGS. 2-3.

Expander 102 additionally includes a power management module 112. Power management module 112 communicates with target 106 to manage the power allocation to target 106. More specifically, power management module 112 exchanges control and status information with target 106 to manage the amount of power allocated to target 106 and the timing of the power granted to target 106. Expander 102 also additionally includes an internal initiator module 114. Internal initiator module 114 may communicate with target 106 to manage the power allocation to target 106, for example, by passing messages from power management module 112 to target 106.

In some embodiments, a monitoring module 108 of expander 102 detects communications between target 106 and initiator 104 to allow for the management of the power allocated to target 106. An internal target module 110 of expander 102 receives communications from initiator 104, for example, by receiving specific power management messages from initiator 104.

Figure 2:
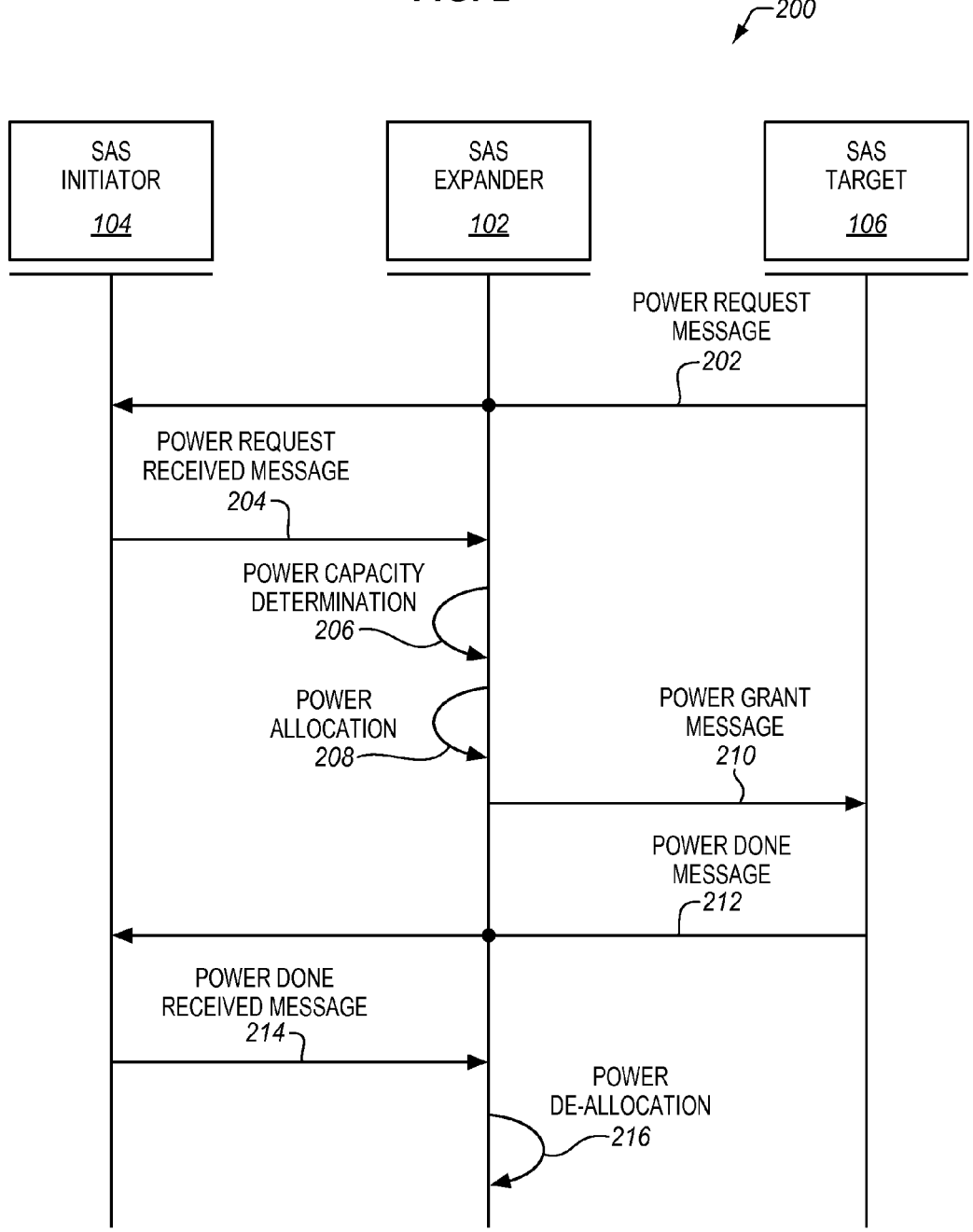
FIG. 2 depicts an exemplary communication sequence in accordance with features and aspects hereof for managing the power allocation for a SAS target.

FIG. 2 is a depiction of an exemplary communication and operation sequence 200 in accordance with features and aspects hereof for managing the power allocation to SAS targets. Although specific messages and operations of sequence 200 are shown in a specific order, one skilled in the art will recognize that the messages and operations may occur in a different order and may include other messages and operations not shown. Sequence 200 illustrates various messages and operations 202-216 occurring at and between expander 102, initiator 104, and target 106 while managing the power allocation to target 106. For example, target 106 may transmit a power request message 202 through expander 102 to initiator 104 in response to target 106 requiring some additional amount of power amount for operation. Target 106 may require some additional power for a number of reasons, such as changing to a spin-up state. When a disk drive performs a spin-up operation, additional power is required by the disk drive until the rotating media reaches a steady state speed. In such a case, target 106 may generate power request message 202 requesting some additional power amount during the change of state.

In response to initiator 104 receiving power request message 202, initiator 104 transmits a power request received message 204 to expander 102 (e.g., to internal target module 110 of expander 102) indicating that target 106 is requesting an additional amount of power. In response to receiving power request received message 204 at expander 102, power management module 112 may perform a power capacity determination 206 to determine if the additional power requested by target 106 is available. For example, target 106 may be one of a plurality of targets coupled with expander 102. In such cases, a power supply (not shown) providing power to the targets may include a finite available power capacity. Therefore, managing the power allocated to the various targets coupled with expander 102 becomes increasingly important. For example, such a power supply may not include enough available power capacity for many of the targets to perform a spin-up operation simultaneously. In such cases, power management module 112 may, after receiving a number of power request messages 202 from a plurality of targets, perform an analysis to determine how to more efficiently service such requests while still maintaining the total supplied power within the available power capacity of the power supply. For example, power management module 112 may hold some power request messages 202 from targets when allocating the pending requests exceeds the total power capacity of the power supply. Power management module 112 may query a power supply coupled with target 106 to determine if an additional power amount is available from the power supply. Power management module 112 may also analyze an internal power allocation table to calculate the current power being utilized and to determine if an additional power amount is available. For example, the power allocation table may include a list of current targets and power amounts allocated for each of the current targets. In other embodiments, power management module 112 may include a counter indicating the current power being delivered to the targets. Thus, when granting power to the targets, power management module 112 may increment the counter value to reflect the additional power allocated. Expander 102 may then perform a power allocation 208 based on an amount of power requested by target 106, or may allocate the power based on a predefined criteria, such as the power requirements of target 106, the type of power transition expected on target 106 (e.g., spin-up operation), etc.

A power grant message 210 is transmitted from expander 102 (e.g., by internal initiator module 114 of expander 102) to target 106. In some cases, power grant message 210 includes a parameter indicating to target 106 that power is granted for a specific amount, such as an amount requested in power request message 202. In other cases, power grant message 210 may include a parameter indicating to target 106 that some lesser portion of the power requested by target 106 is granted. For example, power request message 202 may include a parameter indicating that an additional 10 watts of power is requested by target 106, but power grant message 210 may instead indicate that only an additional 7 watts of power is granted to target 106. In cases where the power granted to target 106 is less than the power requested by target 106, target 106 may modify a desired power transition to remain within the granted power limit of 7 watts. For example, target 106 may in this case perform a modified spin-up process to reduce the additional power required to perform the spin-up operation.

In some embodiments, target 106 may transmit a power done message 214 through expander 102 to initiator 104 when the additional power granted to target 106 is no longer needed. For example, perhaps target 106 has completed a power transition in response to receiving power grant message 210. In some cases, the power released by target 106 may not be the same as the power granted to target 106.

In response to receiving power done message 212, initiator 104 may transmit a power done received message 214 to expander 102 (e.g., to internal target module 110 of expander 102) indicating that target 106 no longer requires the additional amount of power previously granted. Power management module 112 may then perform power de-allocation 216 for target 106. In some embodiments, power management module 112 may de-allocate an amount of power based on a pre-defined power value. In other embodiments, power management module 112 may de-allocate an amount of power based on a parameter within power done message 212.

For embodiments described with regard to FIG. 2 above, the various messages described may comprise SAS frames or primitives, Out Of Band (OOB) messages, a Serial Management Protocol (SMP) message, a Serial SCSI Protocol (SSP) message, and a Serial ATA tunneled protocol (STP) message. Also, the various message described may include a parameter indicating the amount of power requested, granted, or released, based on the specific message. For example, power request message 202 may include a parameter indicating an amount of power requested by target 106. Power request received message 204 may also include the parameter indicating the amount of power requested by target 106. In addition, power grant message 210 may include a parameter indicating an amount of power granted to target 106, while power done message 212 may include a parameter indicating an amount of power released by target 106.

Figure 3:
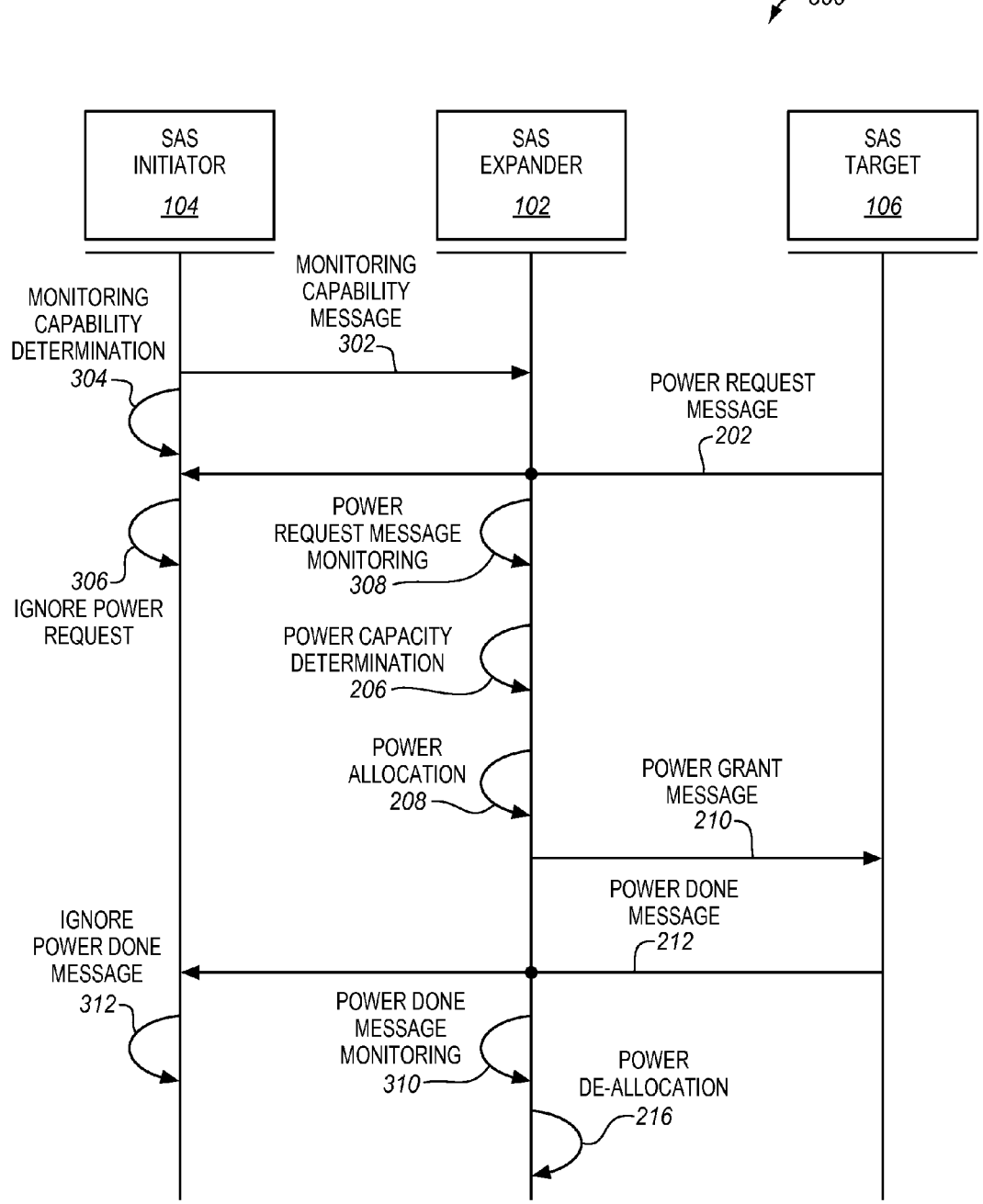
FIG. 3 depicts another exemplary communication sequence in accordance with features and aspects hereof for managing the power allocation for a SAS target.
Figure 4:
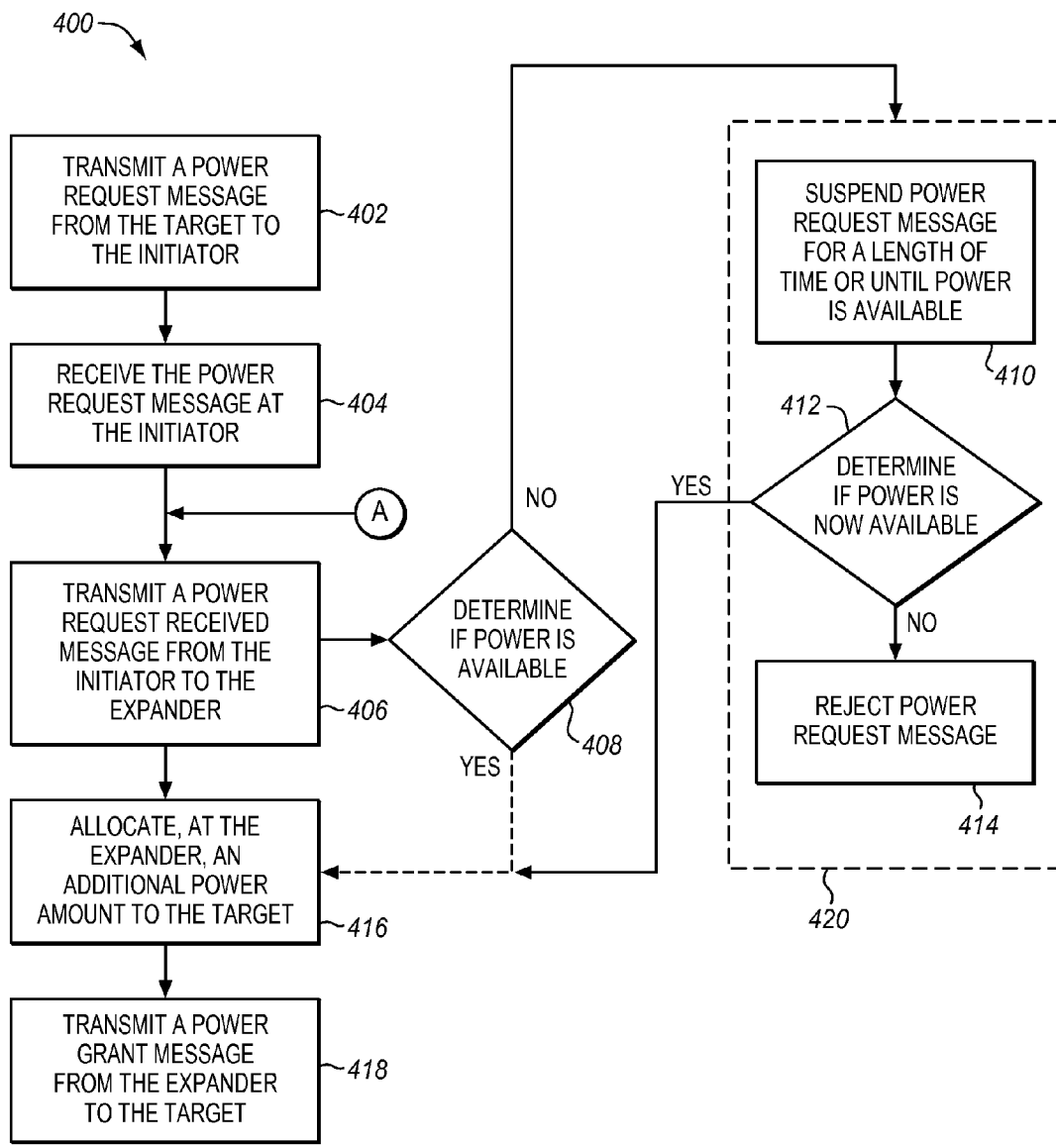

FIG. 3 depicts another exemplary communication and operation sequence 300 in accordance with features and aspects hereof for managing the power allocation to target 106. In FIG. 3, expander 102 monitors (e.g., with monitoring module 108 of expander 102) messages transmitted between target 106 and initiator 104, and performs various power management and power allocation operations for target 106 based on the monitored messages. Although the messages and operations of sequence 300 are shown in a specific order, one skilled in the art will recognize that the messages and operations may occur in a different order and may include other messages and operations not shown. Sequence 300 illustrates various communication messages and operations 202, 206-212, 216, and 302-312 occurring at and between expander 102, initiator 104, and target 106 to manage the power allocation to target 106.

In the embodiment illustrated in sequence 300, initiator 104 transmits a monitoring capability message 302 to expander 102. Monitoring capability message 302 may instruct expander 102 to reveal information regarding a capability to detect communications from target 106 to initiator 104, such as the aforementioned power request message 202 and power done message 212. More specifically, monitoring capability message 302 queries expander 102 to determine if expander 102 includes monitoring module 108. As discussed above, monitoring module 108 detects communications that pass through expander 102 from target 106 to initiator 104. When expander 102 includes monitoring module 108, initiator 104 may ignore specific messages from target 106 in response to performing a monitoring capability determination 304.

Target 106 may, when requiring some additional amount of power for operation, transmit power request message 202 through expander 102 to initiator 104. In response to initiator 104 determining that expander 102 includes monitoring module 108, initiator 104 will ignore power request message 306. Monitoring module 108, when power request message 202 is transmitted by target 106 through expander 102 to initiator 104, will perform power request message monitoring 308 to identify power request message 202. Power management module 112 may then perform a power capacity determination 206 in response to monitoring power request message 202.

Power management module 112 may then allocate power 208 for target 106. In some embodiments, power is allocated based on performing power capacity determination 206. For example, power management module 112 may determine that some amount of power capacity remains, such as 7 watts. Therefore, power management module 112 may allocate power 208 as 7 watts, and correspondingly, a power grant message 210 may be transmitted from expander 102 (e.g., by internal initiator module 114 of expander 102) to target 106 in response to allocating the power to target 106.

When target 106 no longer requires the previously allocated power, target 106 may then transmit power done message 212 through expander 102 to initiator 104. In cases where initiator 104 has determined that expander 102 includes the monitoring capability, initiator 104 may then operate to ignore power done message 312. Power management module 112 may then, in response to performing a power done message monitoring 310 operation, perform a power de-allocation 216 for target 106.

FIGS. 4-7 are flowcharts depicting exemplary methods 400-700 in accordance with features and aspects hereof for managing the power allocation for a SAS target. Methods 400-700 may be performed within system 100 of FIG. 1. Although FIGS. 4-7 illustrates specific steps arranged in a particular order, one skilled in the art will recognize that methods 400-700 may include other steps not shown, and the steps may be performed in an alternate order than shown.

Step 402 transmits a power request message from a SAS target through a SAS expander to a SAS initiator. As noted above, targets may require some additional power amount to change state or operation. In some cases, disk drive targets may change to a spin-up state, thereby requiring more power to transition.

Step 404 then receives the power request message at a SAS initiator. Step 406 then transmits a power request received message from the initiator to the expander (e.g., to an internal target module of the expander). In an optional step 408 for method 400, a determination is made if power is available for the request. As noted above, a power supply coupled with the target(s) may have a finite power capability. Thus, determining if power is available for a target may include identifying the amount of power currently being utilized by targets and determining if an additional amount of power is available to grant to the requesting target. For example, a power supply coupled with the target(s) may be queried to determine if additional power capacity is currently available. If the additional power capacity is not available, then step 410 may be performed. In step 410, the power request message may be suspended for a length of time or until sufficient power becomes available. For example, a power management module within the expander may suspend processing of the power request message for a number of seconds until checking again to determine if power is available to fulfill the pending power request message. A number of targets may be currently granted an additional amount of power, which may place some current power request message in suspension. After the targets are no longer utilizing the additional power, as indicated by a power done message or an elapsed period of time, power request messages currently being suspended may be released for subsequent processing by the expander.

Step 412 determines if the power is now available to fulfill the power request message from the target. If the power is available, then the power may be allocated in step 416. If the power is not available, then the power request message may be rejected in step 414.

Step 416 allocates an additional power amount to the target. Step 418 transmits a power grant message from the expander (e.g., by an internal initiator module of the expander) to the target.

Figure 5:
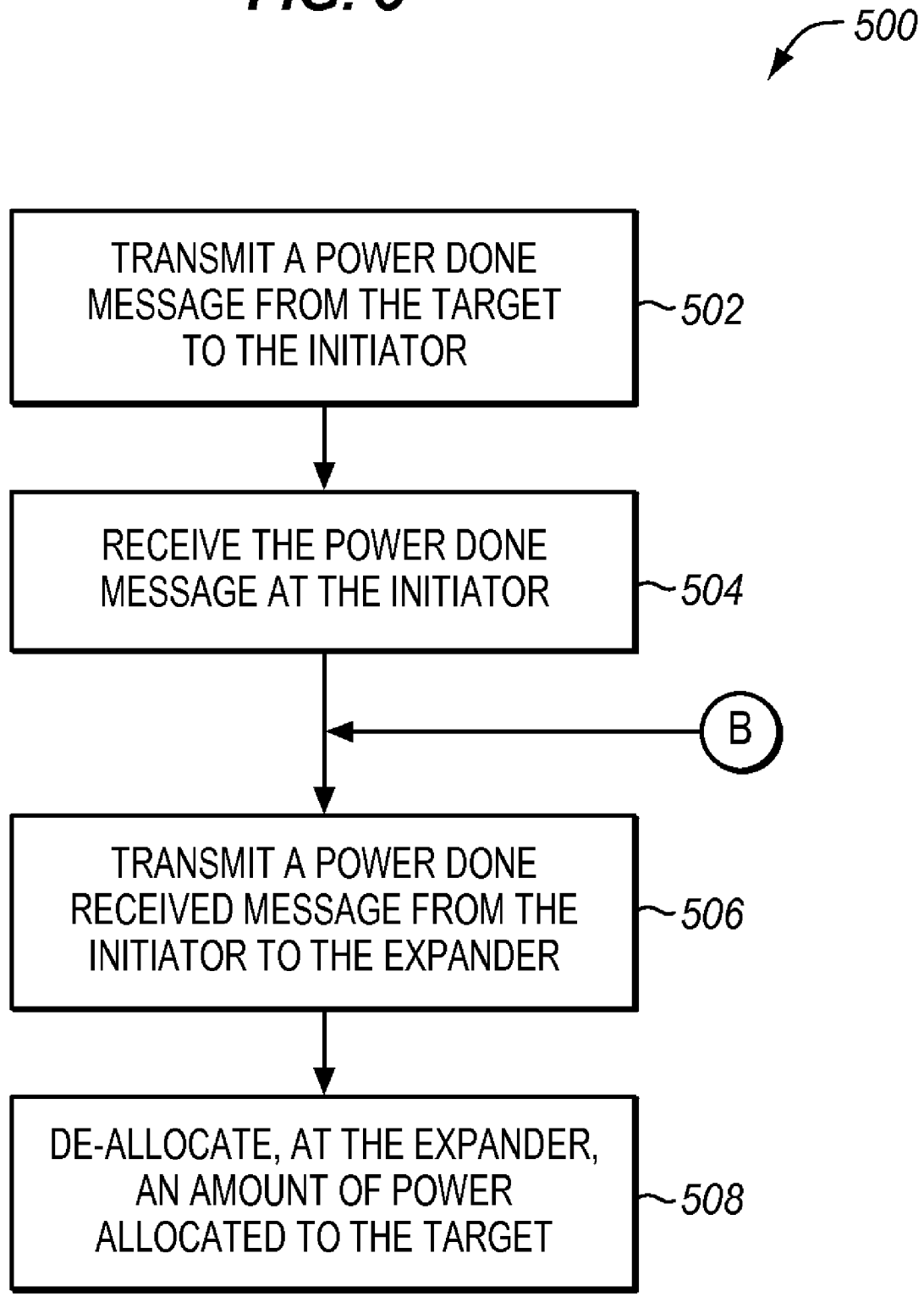

FIG. 5 and method 500 depict an optional embodiment for managing the power allocation for a SAS target. Step 502 transmits a power done message from the target through the expander to the initiator.

Step 504 receives the power done message at the initiator. Step 506 transmits a power done received message from the initiator to the expander (e.g., to the internal target module of the expander) in response to receiving the power done message. Step 508 de-allocates, at the expander, an amount of power allocated to the target in response to receiving the power done message.

FIG. 6 and method 600 include an additional embodiment for managing power allocation for a SAS target. In method 600, an expander coupled between the initiator and the target includes a monitoring capability. As noted above, the monitoring capability allows the expander to detect the communication from the target to the initiator, thus allowing the initiator to ignore some messages transmitted by the target.

Step 602 transmits a power request message from the target through the expander to the initiator. The target may transmit a power request message in response to a change in status by the target, such as anticipating a spin-up operation.

Step 604 receives the power request message at the initiator. Step 606 determines if the expander includes a monitoring capability. For example, the initiator may query the expander at startup to ascertain if the expander includes a monitoring capability for monitoring communication from the target to the initiator (e.g., that the expander includes a monitoring module). In response to the expander including the monitoring capability, the initiator may indicate such using a internal flag or register. Therefore, subsequent monitoring capability determinations may check the flag or register without re-determining if the expander includes the monitoring capability. In cases where the expander does not include the monitoring capability, step 406 of method 400 (See FIG. 4) may be performed. In response to determining that the expander includes the monitoring capability, step 608 is performed and the power request message is ignored by the initiator.

Step 610 monitors the messages at the expander transmitted from the target to the initiator (e.g., with the monitoring module internal to the expander). As noted above, the monitored message may include the power request message. In an optional step for method 600, step 612 may determine if an additional power amount is available for the target. If the additional power amount is not available, then steps 420 of method 400 (See FIG. 4) may be performed. If the additional power capacity requested is available, then the additional power amount is allocated to the target in step 614.

Step 614 allocates, in the expander, an additional power amount to the target (e.g., allocated by the power management module of the expander). Step 616 transmits a power grant message from the expander (e.g., transmitted by the internal initiator module of the expander) to the target.

FIG. 7 and method 700 depict an optional embodiment for managing power allocation for a SAS target. In a like manner to method 600, an expander coupled between the initiator and the target includes a monitoring capability (e.g., includes the monitoring module), which allows the initiator to ignore specific messages from the target.

Step 702 transmits a power done message from the target through the expander to the initiator. Step 704 receives the power done message at the initiator. Step 706 determines if the expander includes the monitoring capability. As discussed above, the initiator may perform a query of the expander at startup to determine if the expander includes the monitoring capability (e.g., if the expander includes the monitoring module) and set a flag or a register indicating the result of the query. If the expander does not include the monitoring capability, then step 506 of method 500 (See FIG. 5) may be performed. If the expander includes the monitoring capability, then step 708 ignores the power done message at the initiator.

In response to the transmission of the power done message from the target through the expander to the initiator, step 710 monitors the power done message at the expander (e.g., by the monitoring module of the expander). Step 712 de-allocates at the expander (e.g., with the power management module of the expander) an amount of power allocated to the target in response to monitoring the power done message.

While the invention has been illustrated and described in the drawings and foregoing description, such illustration and description is to be considered as exemplary and not restrictive in character. Multiple embodiments of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a system comprising a Serial Attached SCSI (SAS) target, a SAS expander communicatively coupled with the target, and a SAS initiator communicatively coupled with the expander, the method comprising:
   transmitting a power request message from the target through the expander to the initiator;
   receiving the power request message at the initiator;
   transmitting a power request received message from the initiator to the expander responsive to receiving the power request message;
   determining, within the expander, whether an additional power capacity is available to fulfill power requested by the target;
   allocating, within the expander, an additional power amount to the target responsive to receiving the power request received message and responsive to determining that the additional power capacity is available; and
   transmitting a power grant message from the expander to the target responsive to receiving the power request received message and responsive to determining that the additional power capacity is available.

2. The method of claim 1 further comprising:
transmitting a power done message from the target through the expander to the initiator;
receiving the power done message at the initiator;
transmitting a power done received message from the initiator to the expander responsive to receiving the power done message; and
de-allocating, within the expander, an amount of power allocated to the target responsive to receiving the power done received message.

3. The method of claim 2 wherein each of the power request received message and the power done received message is one or more of a Serial Management Protocol (SMP) message, a Serial SCSI Protocol (SSP) message, a Serial ATA tunneled protocol (STP) message, and an Out Of Band (OOB) message.

4. The method of claim 1 wherein at least one of the power request message and the power grant message includes a parameter indicating an amount of power, and wherein the parameter for the power request message indicates an amount of power requested by the target and the parameter for the power grant message indicates an amount of power granted to the target.

5. A method operable in a system comprising a Serial Attached SCSI (SAS) target, a SAS expander communicatively coupled with the target, and a SAS initiator communicatively coupled with the expander, the method comprising:
transmitting a power request message from the target through the expander to the initiator;
monitoring, at the expander, messages transmitted between the initiator and the target;
determining, within the expander, whether an additional power capacity is available to fulfill the power request message from the target responsive to the expander monitoring the power request message;
allocating, within the expander, an additional power amount to the target responsive to the expander monitoring the power request message and responsive to determining that the additional power capacity is available; and
transmitting a power grant message from the expander for the target responsive to the expander monitoring the power request message and responsive to determining that the additional power capacity is available.

6. The method of claim 5 further comprising:
determining, at the initiator, whether the expander includes a monitoring capability to detect communications between the initiator and the target;
receiving the power request message at the initiator; and
ignoring the power request message at the initiator in response to the initiator determining that the expander includes the monitoring capability.

7. The method of claim 5 further comprising:
transmitting a power done message from the target through the expander to the initiator;
monitoring the power done message at the expander;
de-allocating, within the expander, an amount of power allocated to the device responsive to the expander monitoring the power done message.

8. The method of claim 7 further comprising:
determining, at the initiator, whether the expander includes a monitoring capability to detect communications between the initiator and the target;
receiving the power done message at the initiator; and
ignoring the power done message at the initiator responsive to the initiator determining that the expander includes the monitoring capability.

9. The method of claim 5 wherein at least one of the power request message and the power grant message includes a parameter indicating an amount of power, and wherein the parameter for the power request message indicates an amount of power requested by the target and the parameter for the power grant message indicates an amount of power granted to the target.

10. A system comprising:
a Serial Attached SCSI (SAS) expander including a power management module, and an internal initiator module;
a SAS initiator communicatively coupled with the expander; and
a SAS target communicatively coupled with the expander and operable to transmit a power request message through the expander to the initiator,
wherein the power management module of the expander is operable to allocate an additional power amount to the target, and
wherein the internal initiator module of the expander is operable to transmit a power grant message to the target
wherein the power management module of the expander is further operable to determine whether an additional power capacity is available to fulfill power requested by the target, and is further operable to allocate an additional power amount to the target responsive to the determination that the additional power capacity is available, and
wherein the internal initiator module of the expander is further operable to transmit the power grant message to the target responsive to the determination that the additional power capacity is available.

11. The system of claim 10
wherein the expander further includes an internal target module,
wherein the initiator is further operable to transmit a power request received message to the internal target module of the expander responsive to the reception of the power request message,
wherein the power management module of the expander is operable to allocate an additional power amount to the target responsive to the reception of the power request received message, and
wherein the internal initiator module of the expander is operable to transmit a power grant message to the target responsive to the reception of the power request received message.

12. The system of claim 11
wherein the target is further operable to transmit a power done message through the expander to the initiator,
wherein the initiator is further operable to transmit a power done received message to the internal target module of the expander responsive to the reception of the power done message,
wherein the power management module of the expander is further operable to de-allocate an amount of power to the target responsive to the reception of the power done received message.

13. The system of claim 12 wherein each of the power request received message and the power done received message is one or more of a Serial Management Protocol (SMP) message, a Serial SCSI Protocol (SSP) message, a Serial ATA tunneled protocol (STP) message, and an Out Of Band (OOB) message.

14. The system of claim 10
wherein the expander further includes a monitoring module operable to detect messages transmitted from the target to the initiator,
wherein the initiator is further operable to query the expander to determine if the expander includes the monitoring module, and is further operable to ignore the power request message responsive to the determination that the expander includes the monitoring module,
wherein the power management module of the expander is further operable to allocate an additional power amount to the target responsive to the monitoring module detecting the power request message, and
wherein the internal initiator module of the expander is further operable to transmit a power grant message to the target responsive to the monitoring module detecting the power request message.

15. The system of claim 14
wherein the target is further operable to transmit a power done message through the expander to the initiator,
wherein the initiator is further operable to ignore the power done message responsive to the determination that the expander includes the monitoring module, and
wherein the power management module of the expander is further operable to de-allocate an amount of power to the target responsive to the monitoring module detecting the power done message.

16. The system of claim 10 wherein the power request message includes a parameter indicating an amount of power requested by the target.

17. The system of claim 10 wherein the power grant message includes a parameter indicating an amount of power granted for the target.

* * * * *